(12) United States Patent
Besson et al.

(10) Patent No.: US 6,381,461 B1
(45) Date of Patent: Apr. 30, 2002

(54) METHOD AND RADIO COMMUNICATIONS SYSTEM FOR TRANSMITTING DATA IN A MOBILE RADIO NETWORK

(75) Inventors: Marcus Besson, Unterhaching; Hans Von Der Neyen; Karl Kammerlander, both of München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/556,661

(22) Filed: Apr. 24, 2000

Related U.S. Application Data

(63) Continuation of application No. PCT/DE98/03119, filed on Oct. 22, 1998.

(30) Foreign Application Priority Data

Oct. 23, 1997 (DE) .......................... 197 46 894

(51) Int. Cl.[7] .......................... H04Q 7/20; H04B 7/212
(52) U.S. Cl. .................. 455/450; 485/561; 370/330; 370/335; 370/336; 370/441; 370/442
(58) Field of Search ................. 455/561, 452, 455/511, 512, 509, 450, 448, 562; 370/329, 330, 331, 335, 336, 337, 342, 343, 344, 345, 347, 441, 442, 478, 479, 480

(56) References Cited

U.S. PATENT DOCUMENTS

| | | | |
|---|---|---|---|
| 4,672,608 A | * 6/1987 | Ball et al. ............... | 370/346 |
| 5,600,707 A | * 2/1997 | Miller, II ............... | 455/434 |
| 5,790,527 A | * 8/1998 | Janky et al. ............ | 370/330 |
| 5,793,757 A | * 8/1998 | Uddenfeldt .............. | 370/335 |
| 5,802,046 A | * 9/1998 | Scott ..................... | 455/509 |
| 5,881,060 A | * 3/1999 | Morrow et al. .......... | 455/450 |
| 5,887,256 A | * 3/1999 | Lu et al. ................. | 455/426 |
| 5,924,026 A | * 7/1999 | Krishnan ................ | 455/414 |
| 5,940,769 A | * 8/1999 | Nakajima et al. ....... | 455/509 |
| 6,091,715 A | * 7/2000 | Vucetic et al. .......... | 370/277 |

FOREIGN PATENT DOCUMENTS

| | | | |
|---|---|---|---|
| DE | 195 49 148 | * 7/1997 | |
| DE | 197 46 894 | 10/1999 | ............. H04Q/7/20 |
| EP | 0 700 225 | 3/1996 | ............. H04Q/7/24 |
| WO | 93/21698 | 10/1993 | ............. H04B/7/26 |
| WO | 95/19079 | 7/1995 | ............. H04J/4/00 |
| WO | 97/24892 | * 7/1997 | |
| WO | 97/30526 | 8/1997 | ............. H04B/7/26 |

OTHER PUBLICATIONS

"Implementation Aspects of the Pan–European Digital Mobile Radio System" (Vary), dated 1989, IEEE, Institut für Nachrichtengeräte und Datenverarbeitung, Technical University, Aachen, FRG, pp. 4–17 to 4–22, as mentioned on p. 4 of the specification.

"Protocol and Signalling Aspects of Joint Detection CDMA" (Mayer et al.), dated 1997, IEEE, XP–002100519 pp. 867–871, as mentioned on p. 2 of the specification.

* cited by examiner

*Primary Examiner*—William Trost
*Assistant Examiner*—Rafael Perez-Gutierrez
(74) *Attorney, Agent, or Firm*—Herbert L. Lerner; Laurence A. Greenberg; Werner H. Stemer

(57) ABSTRACT

In a GSM mobile radio network having at least one base station controller and a first base station, at least one first frequency channel is made available within a frequency band between the first base station and the mobile stations in order to transmit data and to transmit signaling information. According to the invention, the first base station additionally makes available a second broadband frequency channel with a TD/CDMA transmission method. After a connection has been set up in the first or second frequency channel, a handover of the connection to the respective other frequency channel is carried out by the base station controller without a second base station being selected.

18 Claims, 10 Drawing Sheets

METHOD AND RADIO COMMUNICATIONS SYSTEM FOR TRANSMITTING DATA IN A MOBILE RADIO NETWORK

CROSS-REFERENCE TO RELATED APPLICATION

This is a continuation of copending international application PCT/DE98/03119, filed Oct. 22, 1998, which designated the United States.

BACKGROUND OF THE INVENTION

Field of the Invention

The invention lies in the telecommunications field. More specifically, the invention relates to a method and a radio communications system for transmitting data in a GSM mobile radio network, in particular between base stations and mobile stations, over a TD/CDMA radio interface.

The mobile radio network has at least one base station controller (BSC) and a first base station (BS) assigned to a radio cell. At least one first frequency channel is made available between the first base station (BS) and the mobile stations (MS) in order to transmit data and to transmit signaling information with a TDMA transmission method according to the GSM standard. The first base station (BS) additionally makes available a second broadband frequency channel with a TD/CDMA transmission method, according to a standard of the third generation of mobile radios, and a connection (V1) is set up in the first or second frequency channel. A first base station (BS) of the system contains at least one transmitter/receiver device for a second broadband frequency channel with a TD/CDMA transmission method, and the base station controller is embodied in such a way that a connection setup for a connection is controlled in the first or second frequency channel. Such a method and radio communications system are described by Jurgen Mayer et al., in "Protocol and Signaling Aspects of Joint Detection CDMA," Proceedings of $8^{th}$ IEEE International Symposium on Personal, Indoor and Mobile Radio Communications-PIMRC '97, Vol. 3, Sep. 1, 1997, pages 867–71, Helsinki, Finland.

U.S. Pat. No. 5,600,707 (European published patent application EP 0 700 225) describes a radio system which has a base station with a TDMA transmission unit and a wireless ISDN transmission unit. A TDMA channel with a low data rate is used to set up a wireless ISDN connection provided with a high data rate.

U.S. Pat. No. 5,793,757 (International PCT publication Wo 97/30526) describes a mobile radio system with so-called dual mode base stations which support both timeslots with FDMA/TDMA channels and timeslots with CDMA channels.

In mobile radio networks, messages (for example voice, image information or other data), are transmitted using electromagnetic waves over a radio interface between a transmitting radio station and a receiving radio station (base station or mobile station). The electromagnetic waves are irradiated here with carrier frequencies which lie in the frequency band provided for the respective system. In the case of the GSM (Global System for Mobile Communication), the carrier frequencies lie in the region of 900, 1800 or 1900 MHz. For future mobile radio networks using TDMA or TD/CDMA methods for transmitting over the radio interface, for example the UMTS (Universal Mobile Telecommunications System) or other $3^{rd}$ generation systems, frequencies in the frequency band of approximately 2000 MHz are provided.

German published patent application DE 195 49 148 discloses a radio communications system which utilizes CDMA subscriber separation (CDMA Code Division Multiple Access), the radio interface additionally having time-division multiplex subscriber separation (TDMA Time Division Multiple Access). Consequently, a TD/CDMA transmission method is used for the radio interface. At the receive end, a JD (Joint Detection) method is used to perform improved detection of the transmitted data based on the knowledge of spread codes of a plurality of subscribers. Here, it is known that at least two data channels can be assigned to a connection over the radio interface, it being possible to distinguish each data channel by means of an individual spread code. The radio communications system which is used in this context is a candidate for a system of the $3^{rd}$ generation of mobile radios.

The article by P. Vary, "Implementation Aspects of the Pan-European digital mobile radio system" IEEE 1989, pp. 4-17 to 4-22, discloses the structure of a GSM radio station with RF component, filters, channel estimators, modulators/demodulators, channel encoders/channel decoders. The GSM standard uses a combination of FDMA (Frequency Division Multiple Access) and TDMA for the radio interface and has met with acceptance throughout the world. This standard is used to provide services to over 20 million subscribers in Europe alone. There has already been extensive investment in the infrastructure and in mobile stations.

The transition from the $2^{nd}$ generation of mobile radios (GSM) to the $3^{rd}$ generation of mobile radios will again require considerable investment on the part of the network operators if network elements such as mobile switching center, mobile station controller or base stations have to be replaced or installed additionally. Significant development costs will also be incurred by the manufacturers of the infrastructure and mobile stations.

SUMMARY OF THE INVENTION

It is accordingly an object of the invention to provide methods and radio communications systems for transmitting data in a mobile radio network, which overcome the disadvantages of the heretofore-known devices and methods of this general type and which make it possible to migrate from an existing GSM mobile radio network favorably in terms of cost and effort.

With the foregoing and other objects in view there is provided, in accordance with the invention, a method of transmitting data in a mobile radio network having a first base station assigned to a radio cell, which comprises the following steps:

making available, with a first base station assigned to a radio cell, a first frequency channel for data transmission and an organization channel for transmitting signaling information with a transmission method according to a first mobile radio standard;

additionally making available, with the first base station, a second frequency channel with a transmission method according to a second mobile radio standard; and signaling via the organization channel of the first mobile radio standard the standards supported in the radio cell.

In accordance with an additional feature of the invention, a connection is set up in the first or in the second frequency channel; and the connection is handed over to the respectively other frequency channel without selecting a second base station.

In accordance with another feature of the invention, the first mobile radio standard is a GSM standard and the second mobile radio standard is a third generation mobile radio standard.

The system is preferably implemented in the popular GSM mobile radio network having at least one base station controller and one first base station. At least one first frequency channel is made available between the first base station and mobile stations in order to transmit data and to transmit signaling information. In a specific embodiment, the first base station additionally makes available a second broadband frequency channel with a TD/CDMA transmission method. After a connection has been set up in the first or second frequency channel, a handover of the connection to the respective other frequency channel is carried out by the base station controller without a second base station being selected.

This means that, a new transmission method is provided on the basis of an already existing base station system by retrofitting a base station which is already installed in the GSM network, this fact applying equally to the carrier frequencies in the 900, 1800 and 1900 MHz ranges. Thus, no additional expenditure or effort is needed to provide a new base station system. By incrementally retrofitting the base stations, the coverage is improved in a way which permits the additional radio capacity to be provided where there is an adequate level of demand for it. This thus reduces the investment risks for network operators.

Without neglecting the provision of services to GSM mobile stations, it is possible to ensure, on a selective basis, that coverage is provided to mobile stations which use the radio interface according to a TD/CDMA transmission method. For mixed mode mobile stations which can use both frequency channels, complete coverage is ensured and additional, new, higher-rate services can be provided in specific regions.

The handover of the connection does not only include connections which have already been set up but can also be applied in cases in which the mobile station receives organizational or signaling information, or transmits signaling information, in one frequency channel, advantageously the first frequency channel, but the useful information is transmitted in another frequency band, for example the second frequency band.

The migration from existing GSM mobile radio networks to a $3^{rd}$ generation radio communications system is thus significantly simplified. The TD/CDMA transmission method combines advantages of the known TDMA transmission method with those of the simple implementation of higher-rate services with a variable data rate using a CDMA subscriber separation method, both transmission methods using the same timing pattern.

The broadband configuration of the second frequency channel enables the transmitter/receiver devices to be manufactured more economically in comparison with a large number of narrow band frequency channels because fewer RF components are required and better and cheaper digital signaling processing means are progressively making the processing of signals easier at the receive end and the transmit end.

According to one advantageous development of the invention, the frequency bands of the first and second frequency channels overlap. This means that the TD/CDMA transmission method is used in frequency bands which have been kept available in the GSM mobile radio system. By means of appropriate frequency planning, the plurality of coherent frequency bands are assigned at least to individual base stations, and the frequency bands are then also used by the second, broader band frequency channel. This is implemented in a particularly advantageously way if the frequency band of the second frequency channel comprises at least eight frequency channels with a bandwidth equal to the first frequency channel. The second frequency channel has, for example, a bandwidth of 1.6 or 3.2 MHz and thus comprises eight or 16 previous 200 kHz narrowband GSM frequency bands. The second frequency channel is therefore adapted to the frequency and timing pattern of the GSM mobile radio network.

A further advantageous embodiment of the invention provides for the first and second frequency channels to be implemented in the same frequency band but in different timeslots. This is advantageous particularly in radio cells in which coverage is to be provided for GSM, TD/CDMA, and mixed mode mobile stations without requiring additional frequency bands. The timeslots can be distributed between the two transmission methods according to demand.

The distribution of a plurality of connections among the timeslots is advantageously controlled by the base station controller in such a way that a timeslot of a TDMA or TD/CDMA transmission method is handed over for the respective other transmission method. This means that the timeslots are filled with connections to a satisfactory degree and, when there are fluctuations in demand, as many timeslots as possible are assigned to a transmission method for which there is greater demand. In this way, none of the individual GSM timeslots block the use of a timeslot over the entire bandwidth of the second frequency channel which has a higher transmission capacity. The same applies to redistribution of the connections in the opposite direction.

The handover of a connection to the respective other transmission method is carried out as soon as the capacity utilization of the frequency channel drops below a first threshold value or the ratio of mobile stations with TD/CDMA compatibility to other mobile stations within a radio environment reaches a second threshold value. By introducing the threshold values, the previous demand or the future demand which can be derived from the mobile stations located in the radio cell is estimated and the radio resources are used in the best possible way by distributing the connections at the appropriate time.

With the above and other objects in view there is also provided a novel radio communications system, comprising:
- a base station assigned to a radio cell of the radio communications system, the base station being designed to transmit data in a first mobile radio standard in a first frequency channel;
- the base station having at least one transmitter/receiver device (TRX2, TRX3) for a second frequency channel with a transmission method according to a second mobile radio standard; and
- the base station signaling via an organization channel for transmitting signaling information with a transmission method according to the first mobile radio standard the standards supported in the radio cell.

In other words, the radio communications system has a plurality of base stations, the first of which supports both frequency channels and the second only supports the TDMA transmission method of the GSM standard, handovers of connections from the second base station without TD/CDMA compatibility advantageously take place preferably to the first base station. By virtue of the two frequency channels, the second base station will have more extensive radio resources. The handovers between the base stations can also be performed according to the principles and threshold values mentioned above.

In each base station the GSM mobile radio network provides organizational and signaling channels which are available over large areas. The signaling information of the first frequency channel is advantageously used for handing over connections or for a connection setup. In this way, even in the case of frequency channels which do not overlap, no additional signaling complexity, or only a slight degree of signaling complexity, becomes necessary and additional capacity can be put to better use for a transmission of useful information.

A further advantageous development of the invention provides for an interrogation of a desired data rate to be carried out for handing over connections or for a connection setup, and for the first or second frequency channel to be selected after this. In this way, an appropriate allocation of a transmission method can be prepared even during a connection setup or when a higher or lower data rate is desired during the connection. In this context, the first frequency channel is more suitable for transmitting voice and lower data rates, and the second frequency channel is more suitable for higher-rate services (Internet or Multimedia Services).

The retrofitting of the base station is carried out using additional transmitter/receiver devices for the TD/CDMA transmission or by replacing a GSM transmitter/receiver device by a common transmitter/receiver device for both transmission methods. Despite the retrofitting, it is, however, possible to use common modules, for example antennas, RF components, amplifiers, synchronization and clock modules, interfaces to the base station controller etc., commonly.

The scope of the invention includes the fact that the first and second frequency channels are assigned to different cell sizes in accordance with a hierarchical cell model. During a migration phase, it may be advantageous to provide the second frequency channel for the TD/CDMA transmission only in specific highly restricted areas ("hot spots"), i.e. thus to specify microcells or to equip macrocells for radio cells with generally lower densities on new mixed mode mobile stations.

The method according to the invention also provides freedom of maneuver in the ratio of uplink direction and downlink direction. For the purpose of asymmetrical transmission of information, as is required for multimedia services, it is possible to use different data rates in the two transmission directions. Alternatively, identical frequency bands, but different timeslots, can be used in the uplink and downlink directions. In this way, the use of DECT radio communications systems can also be included.

As an alternative to TD/CDMA methods, it is possible, as is described in the above-mentioned German patent publication DE 195 49 148 (incorporated by reference), for the second frequency channel to use other methods which are based on the same time frame structure as the GSM mobile radio network but use spreading according to a frequency jump sequence or a broadband transmission according to OFDM transmission as in European patent publication EP 97 105 149 (incorporated by reference).

Other features which are considered as characteristic for the invention are set forth in the appended claims.

Although the invention is illustrated and described herein as embodied in a method and radio communications system for transmitting data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
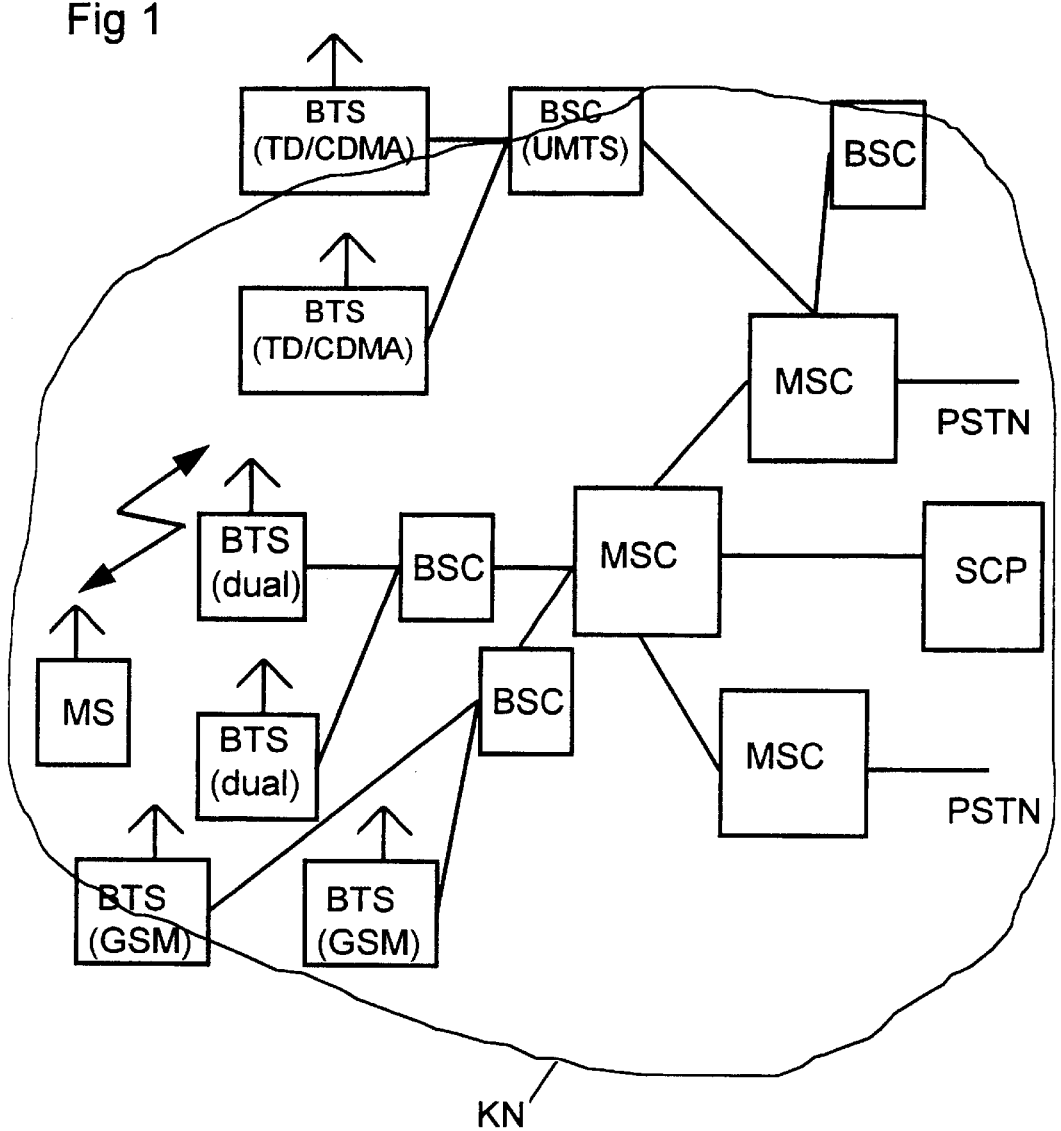
FIG. 1 shows a block circuit diagram of a radio communications system.

Referring now to the figures of the drawing in detail and first, particularly, to FIG. 1 thereof, there is shown a radio communications system KN that corresponds in its structure to a known GSM mobile radio network which is composed of a multiplicity of mobile switching centers MSC which are networked to one another or provide access to a fixed network PSTN. In addition, these mobile switching centers MSC are each connected to at least one base station controller BSC. Each base station controller BSC in turn permits connection to at least one base station BTS. Such a base station BTS is a radio station which can set up a radio link to mobile stations MS over a radio interface. A service control unit SCP implements, in the manner of an intelligent network (IN), software update functions for the mobile radio network or for parts thereof.

In terms of the structuring of the mobile radio network, it is possible to make a distinction between devices BTS, BSC which support services according to the GSM standard, those which support services according to a $3^{rd}$ generation standard (UMTS) with TD/CDMA radio interface or those which support both standards. The radio cells of the respective base stations BTS(dual), BTS(GSM), BTS(TD/CDMA) can also overlap in this respect.

Figure 5:
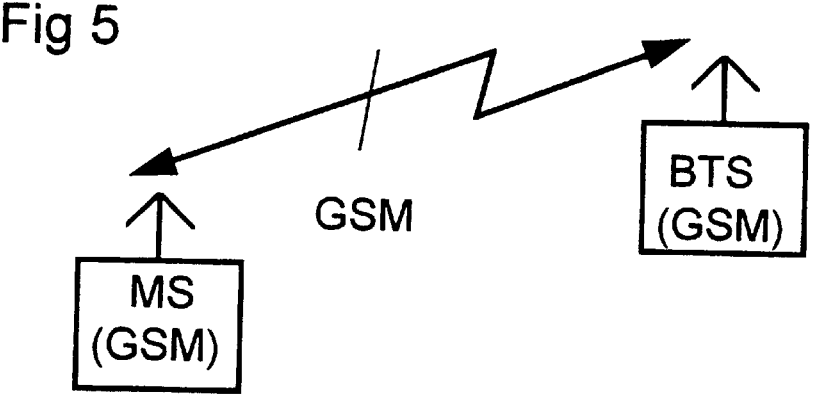
FIG. 5 to FIG. 8 show various combinations of mobile stations and base stations and their ability to support TDMA and TD/CDMA transmission methods.
Figure 8:
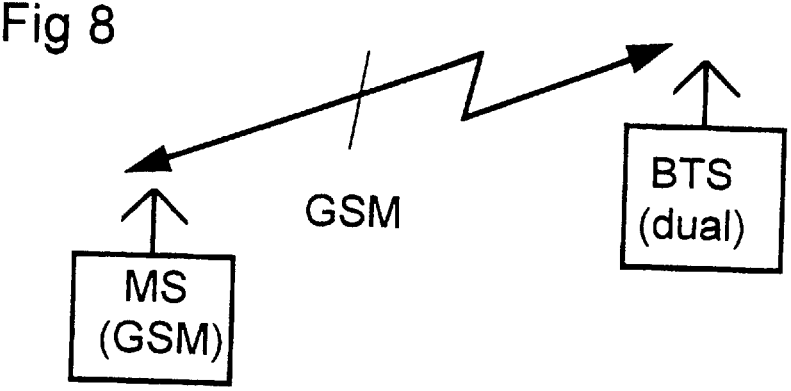

The intention is that the invention will not impede the mobility of the mobile stations MS as a result of the different standards available. A mobile station MS which supports only the GSM standard can still set up a radio link to a base station BTS of the GSM standard (FIG. 5). However, the mobile station MS can also be supplied by a base station BTS which supports both standards (TD/CDMA, GSM) in dual fashion (FIG. 8). A base station BTS which supports TD/CDMA and TDMA transmission according to GSM is a base station according to the invention.

Figure 6:
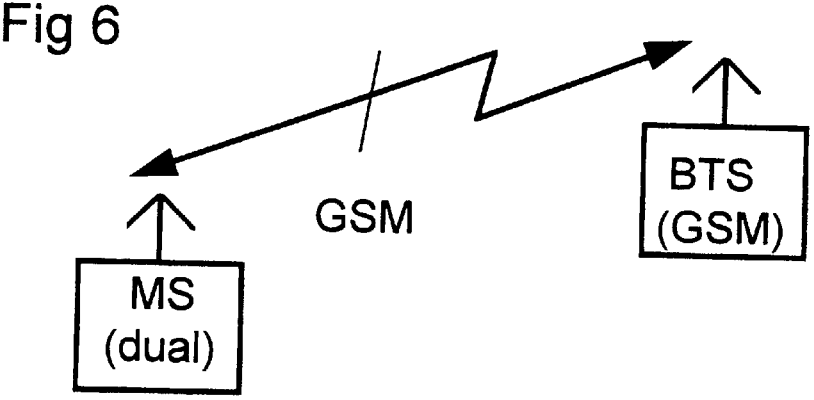
Figure 7:
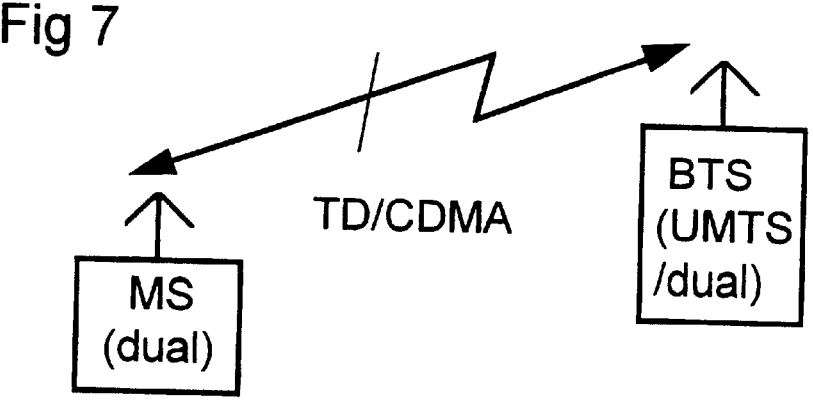

A mixed mode mobile station MS which supports both standards (FIGS. 6 and 7) can communicate both with a GSM base station BTS(GSM) and with a base station BTS which permits only TD/CDMA transmission or permits both transmission methods.

A mobile station MS or a base station BTS which supports TD/CDMA and GSM transmission does not have to have all the program modules necessary for this stored continuously. Loading program modules replaces or supplements the existing program modules in the manner of a software update or a parameter setting and is carried with support from the network by means of the service control unit SCP.

Figure 2:
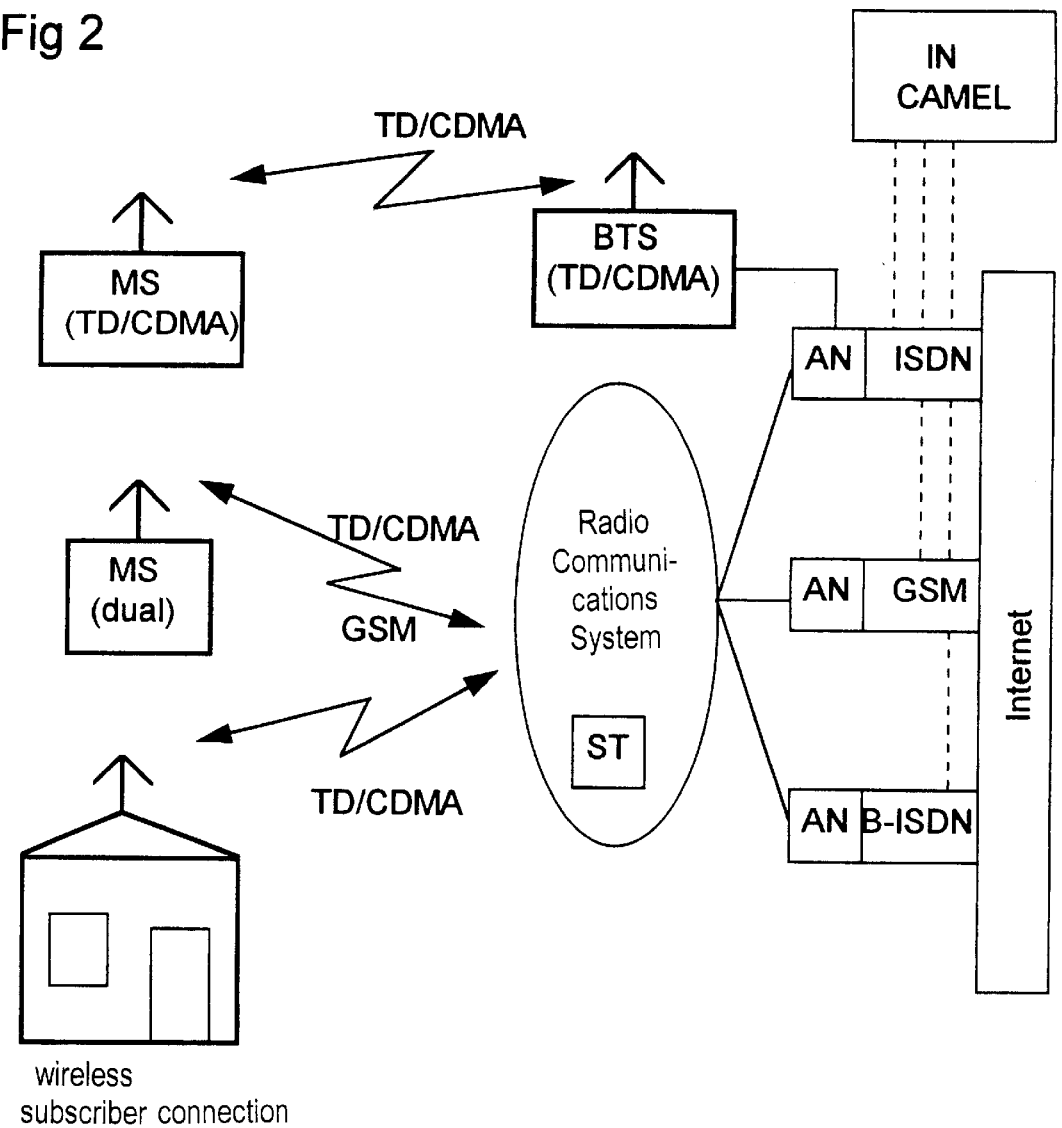
FIG. 2 shows a convergence principle for various transmission services in a radio communications system.

With support from intelligent networks IN (in particular the CAMEL protocol of the GSM mobile radio network), it is possible to combine previously separate functions of communications networks according to FIG. 2. By means of a TD/CDMA transmission, it is possible not only to connect mobile radio stations (mobile station MS) but also to connect fixed radio stations (wireless in the local loop) by wireless means. In addition, it is also possible in the indoor area to connect base stations BTS (TD/CDMA) by means of an ISDN line so that a home base station is available in the manner of cordless subscriber terminals. A radio communications system corresponding to the invention can be connected to the Internet or to other transmission networks by means of configurable UMTS access nodes AN using ISDN, GSM (PCM) or B-ISDN lines.

The services used and the communications networks used for transmission can thus be separated, with the result that different services can also be made available by different communications networks. A multiplicity of application servers can be used irrespective of the communications network, different communications networks being connected, for example, using ATM transmission links.

Figure 3:
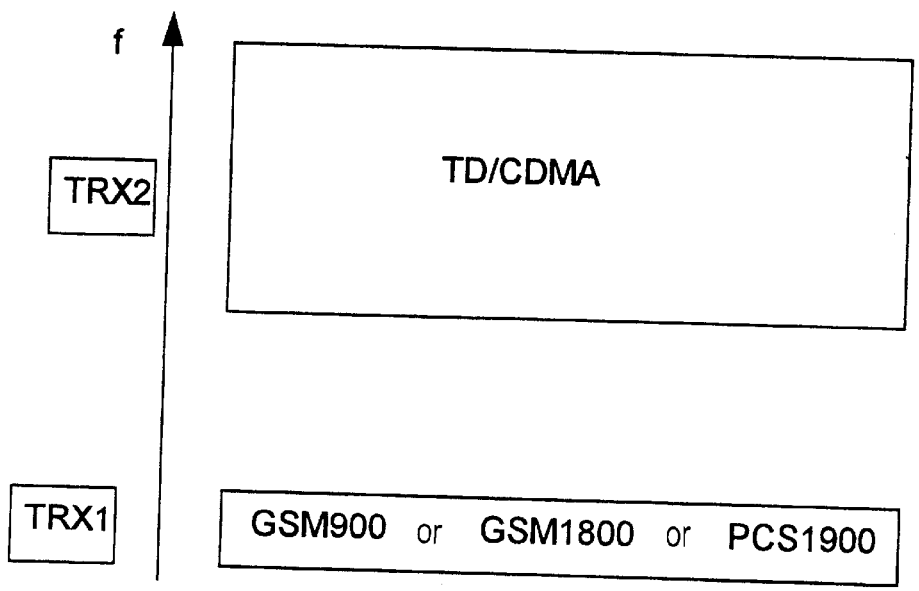
FIGS. 3, 4 show an illustration of the frequency bands for separate or overlapping frequency channels.
Figure 4:
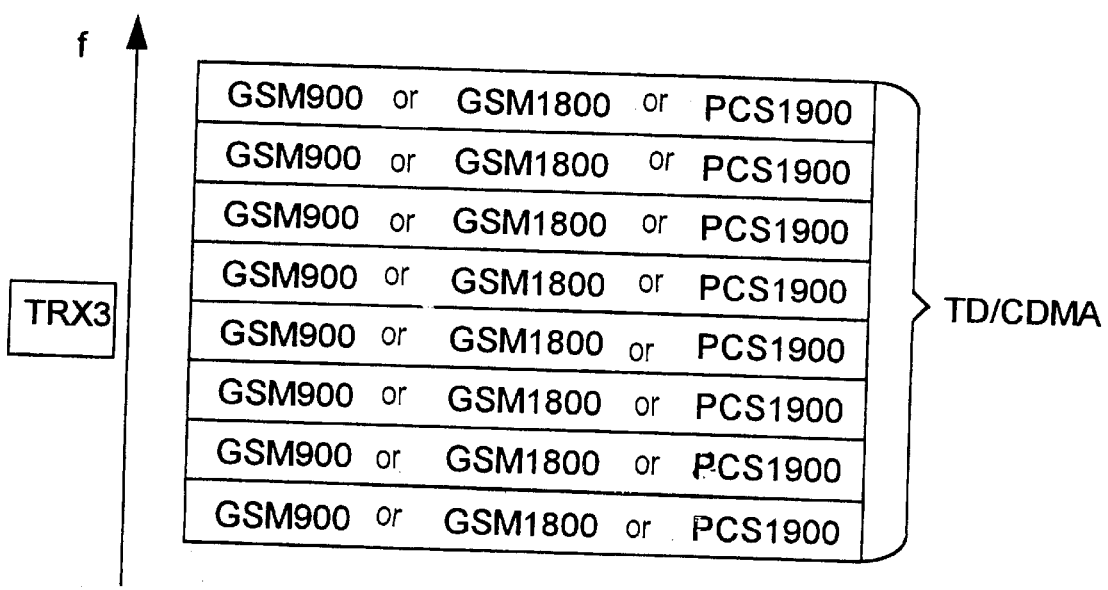

If the radio interface between a first base station BTS and other radio stations MS(TD/CDMA), MS(dual) is considered, frequency bands according to FIGS. 3 and 4 can be distributed between the two transmission methods. In FIG. 3, a GSM900, GSM1800 or PCS1900 frequency band comprises a first frequency channel with 200 kHz bandwidth. This first frequency channel is implemented by means of first transmitter/receiver device TRX1. A second frequency band for a UMTS transmission method at approximately 2000 MHz is separate and comprises a second frequency channel for a TD/CDMA transmission. This second frequency channel is implemented by means of a second transmitter/receiver device TRX2.

Mixed mode mobile stations MS are capable here of evaluating both frequency channels. In particular, organizational and signaling information which is transmitted by the base station BS only in the first frequency channel is also received and evaluated for the connection setup, for a handover, and for adjacent cell measurements.

In FIG. 4, the frequency bands of the first and second frequency channels overlap, i.e. eight first narrowband 200 kHz frequency bands form a broadband 1.6 MHz frequency channel for the TD/CDMA transmission, which frequency band is implemented by means of a third transmitter/receiver device TRX3. The TD/CDMA transmission method is therefore implemented in a GSM frequency band.

Figure 10:
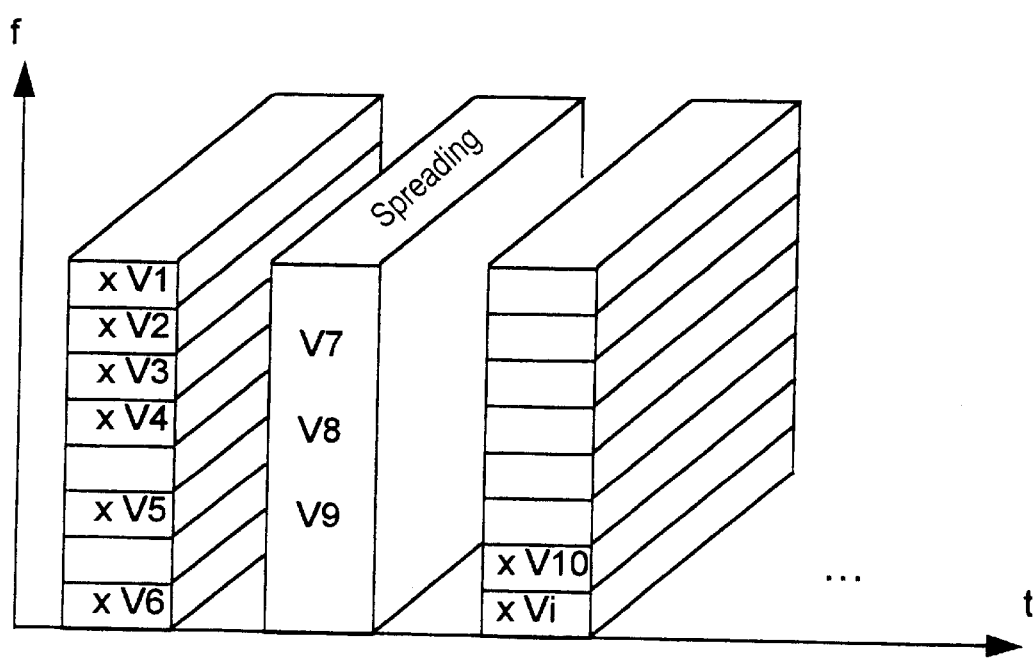
FIG. 10 shows a schematic illustration of the time frame structure.

FIG. 10 shows that the two transmission methods are distinguished by means of timeslots within the TDMA frame structure which is common to both transmission methods. Three timeslots are shown by way of example, the first timeslot containing eight GSM channels, 6 of which are seized by connections V1 to V6. In the second timeslot, there is in addition spreading with individual spread codes according to the TD/CDMA method, with the result that three connections V7 to V9 are transmitted. By assigning a plurality of spread codes, correspondingly higher data rates can be made possible for the connections V7 to V9. In the third timeslot, just two GSM channels are seized by connections V10 and Vi.

The radio interface of the TD/CDMA method can be defined as follows:
  eight timeslots per frame,
  64 full rate voice channels per frame,
  8 spread codes per timeslot,
  bandwidth 1.6 MHz (alternatively 3.2 MHz),
  radio block length 577 $\mu$s,
  QPSK or 16 QAM modulation of data to be transmitted,
  linearized GMSK spread modulation,
  chip rate 2.167 Mchips/s,
  line-switched or packet-switched data rates of 1 Mbit/s and 2 Mbit/s for indoor environments.

For the case shown in FIG. 10, the control device ST according to FIG. 2, which is usually implemented in a base station controller BSC, performs a handover of the connections V10 and Vi from the third timeslot to the first timeslot, so that the third timeslot can optionally also be used for a TD/CDMA transmission.

This distribution is also initiated by the fact that the loading of the third timeslot has dropped below a first threshold value of 3 and there are first frequency channels available to a sufficient degree in other GSM timeslots. This distribution can, however, also be triggered by the fact that a connection V1 leads to a mixed mode mobile station MS which requests a higher data rate or a new service so that a changeover of the connection V1 to a high-rate TD/CDMA transmission becomes necessary. Here, a handover from the first to the second frequency channel takes place within a base station BS.

During the actual set up of the connection, mixed mode mobile stations MS are preferably handed over to base stations BS which can offer free transmission capacity on the second frequency channel. This takes place even if it were also possible to set up a connection to other base stations BS. A handover also takes place if a plurality of mixed mode mobile stations MS which are possibly requesting a higher-rate service sign on in one radio cell. If, for example, the ratio of connections V1, V2, V3 (mixed mode) to the connections V4, V5, V6 is equal to 1, and thus reaches a second threshold value, a second timeslot is also prepared for the TD/CDMA transmission.

Figure 9:
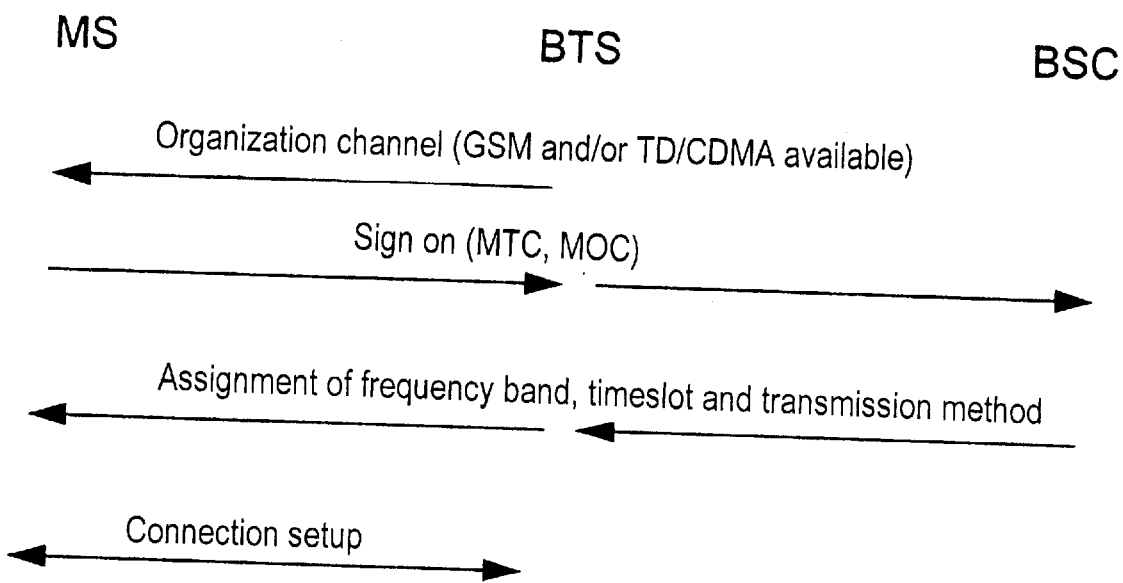
FIG. 9 shows a schematic illustration of the signaling to set up a connection.

An exchange of signals between a mobile station MS and the radio communications system starts with a network-end information item relating to an organizational channel (FIG. 9). This information signals to the mobile station MS which standards are supported in the respective radio cell and which radio channels are available. Here, an organizational channel from the GSM mobile radio network is used.

If the subscriber of the mobile station MS enters a call request (MOC) or desires to make a connection setup to the mobile station MS (MTC), the connection setup is registered and the desired service signaled, after which the base station controller BSC performs an assignment of the frequency band, timeslot, and transmission method and signals to the mobile station MS via the base station BS. The connection Vi is subsequently implemented in the signaled frequency channel.

Figure 11:
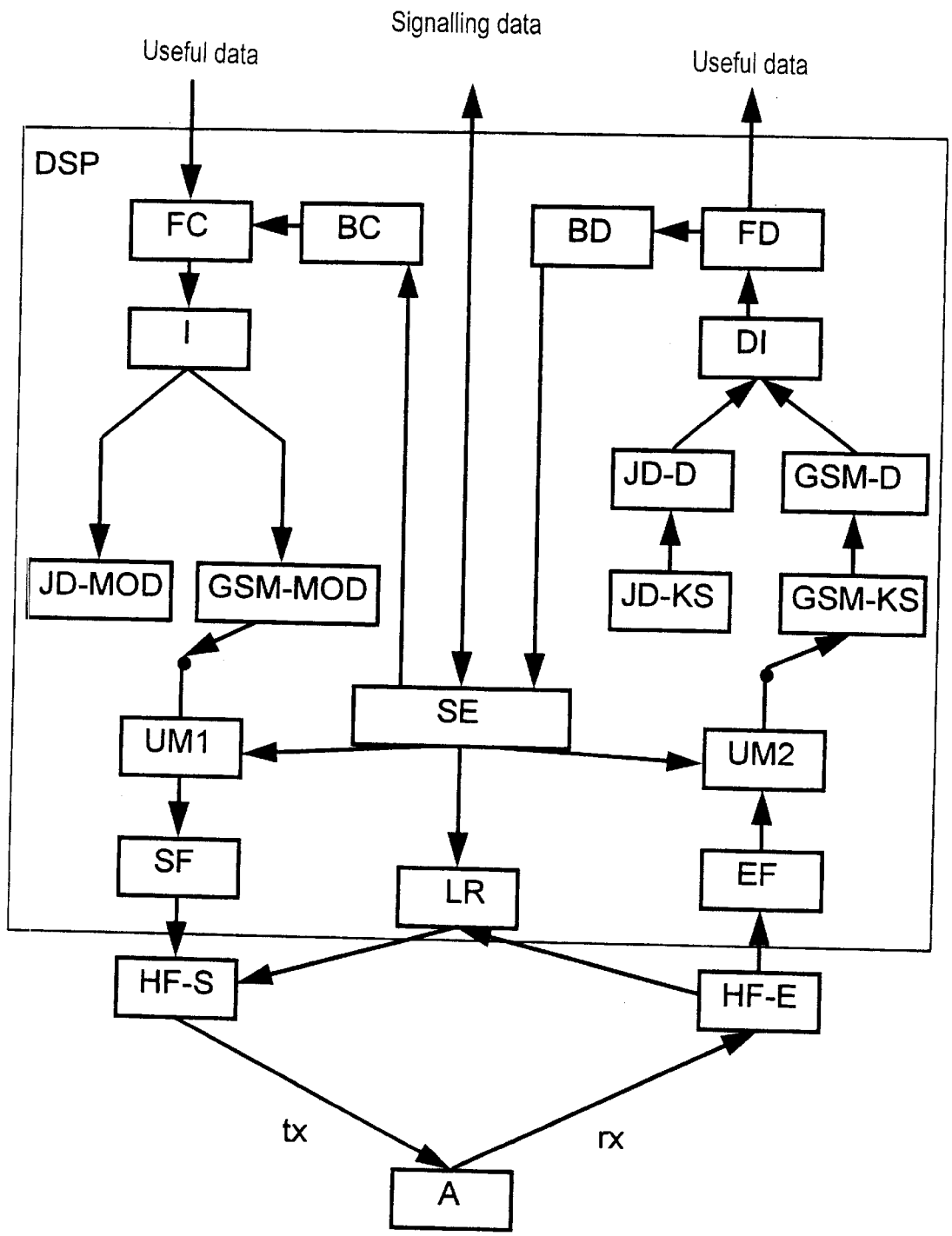
FIG. 11 shows a block circuit diagram of the signal processing means.

Set up of a transmitter/receiver device TRX3 with both transmission methods within a base station is shown in simplified form in FIG. 11, in which process splitting is performed into a digital component, which is implemented using digital signal processing means DSP, and an RF component, which is composed of a transmitter component HF-S and a receiver component HF-E. The transmitter component HF-S and the receiver component HF-E are connected to a common antenna device A. Common components for a plurality of transmitter/receiver devices TRX1, TRX2, TRX3, such as amplifier, synchronization and clocking modules, interfaces to the base station controller and to the organizational, and a maintenance center OMC are not illustrated.

The transmit path for the digital signal processing is composed of a convolution code FC for channel coding useful data and signaling data which have previously been block-coded in a block coder BC. Subsequently, the data are encrypted in an interleaver I and depending on the transmission standard, fed to a modulator GSM-MOD for GSM modulation or to a modulator JD-MOD for TD/CDMA modulation. A first switch-over means UM1, which is controlled by a control means SE as is also a second switch-over means UM2 shown later, connects the selected modulator GSM-MOD or JD-MOD to a digital transmit filter SF and also to the transmit component HF-S. A means LR for regulating the transmission power controls the transmission power for transmit signals tx according to the specifications of the control means SE.

In the reception path, received signals rx which are received by the antenna device A are conditioned in the receive component HF-E and fed to the digital signal processing means. A digital receive filter EF filters the broadband received signals rx and, via the second switch-over means UM2, outputs the signals to a channel estimator which is either a channel estimator GSM-KS according to the GSM standard or a channel estimator JD-KS according to the TD/CDMA standard. After the channel estimation, the signals are fed to the respective data estimator GSM-D or JD-D, which perform the data detection. In a Deinterleaver DI, the data of both paths are jointly decrypted again and subsequently fed to a convolution decoder FD for channel decoding. Signaling information is fed to a block decoder BD which decodes these data and outputs them to the control means SE.

The control means SE forwards the signaling data which are to be transmitted or received to the transmit or receive path and sets up the connection to network-end signaling channels to the base station controller BSC.

Figure 12:
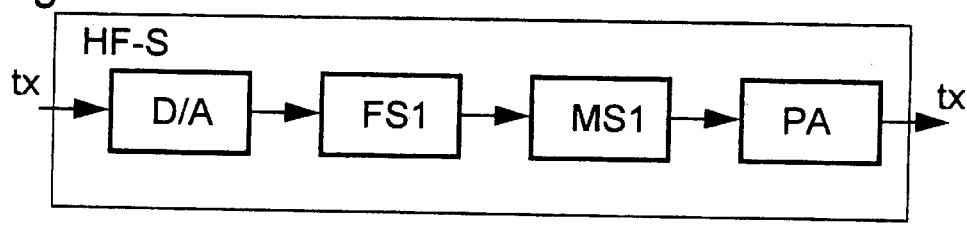
FIG. 12 shows a block circuit diagram of the RF component of the transmitter.

The transmit component HF-S according to FIG. 12 contains a digital/analog converter D/A for real and imaginary components, first analog transmit filter FS1 for lowpass filtering of the signals in the baseband, a first mixer stage MS1 for converting the transmit signals tx to the transmit frequency band, and a power amplifier PA for amplifying the transmit signals tx.

Figure 13:
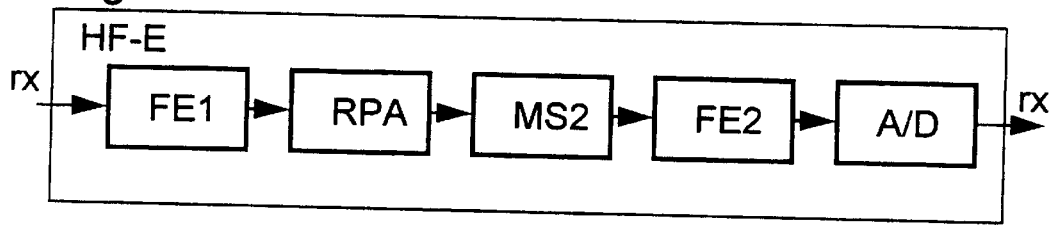
FIG. 13 shows a block circuit diagram of the RF component of the receiver.

The receive component HF-E according to FIG. 13 contains a first analog reception filter FE1, a reception amplifier RPA for measuring and amplifying the received signals rx, a second mixer stage MS2 for converting the received signals rx to the baseband (a plurality of mixer stages can also be used), second analog reception filters FE2 and, finally, an analog/digital converter A/D for real and imaginary components, which generate digital received signals rx which can be processed in the digital signal processing means DSP.

The receive components HF-E and transmit component HF-S are broadband components, configured for example for B=1.6 MHz. Only the TD/CDMA mode is explained in more detail below.

Figure 14:
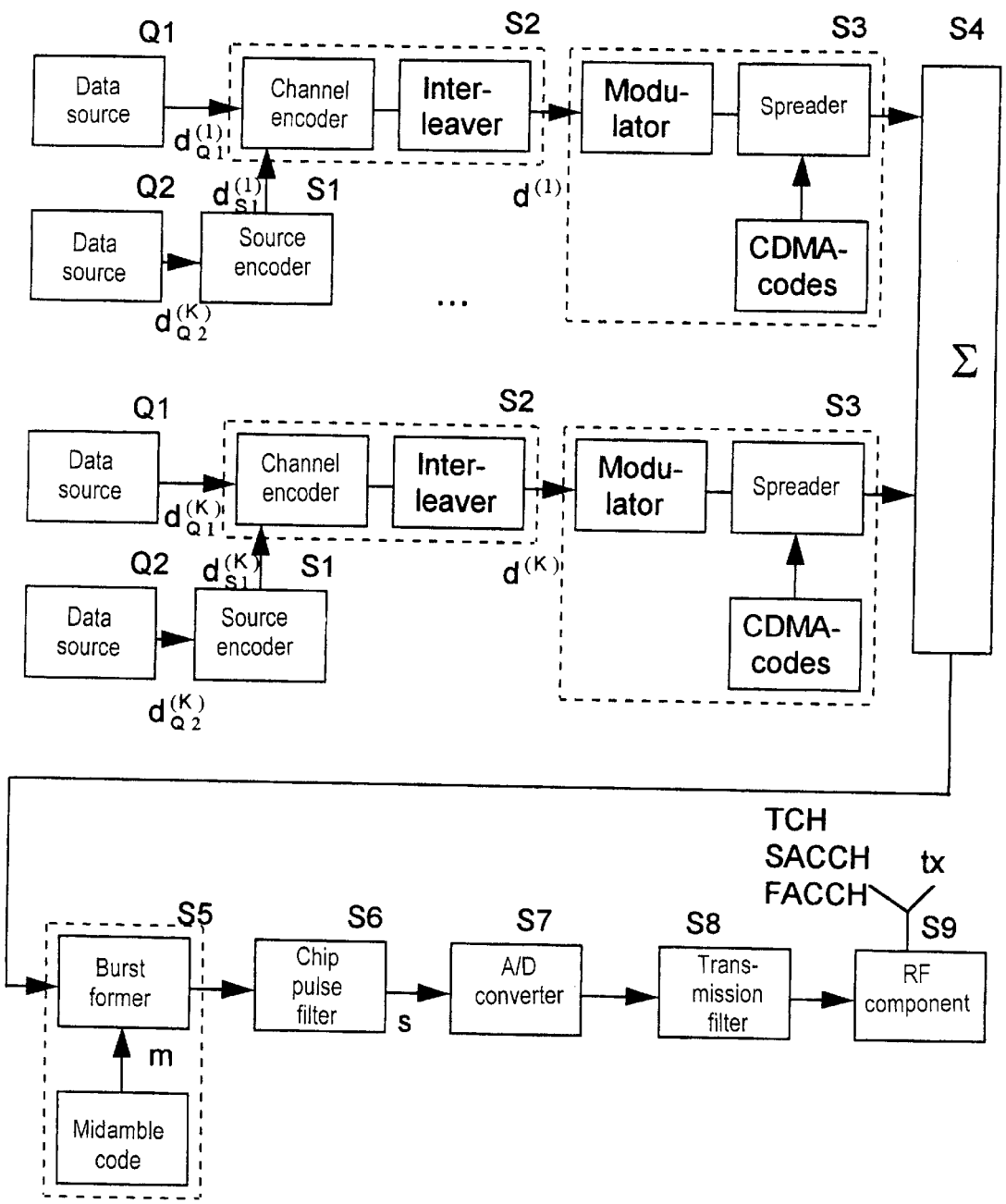
FIG. 14 shows a detailed block circuit diagram of the transmitter for TD/CDMA transmission.

FIG. 14 illustrates the transmit path of the device in detail. It is illustrated in the customary description form for modeling and simulating a telecommunications system in which the dependence between the various functions and the system structure is illustrated.

In the submodule S2, the input data $d_{S1}^{(k)}$, d=1 . . . K, which are obtained either from the uncoded data $d_{Q1}^{(k)}$, k=1 . . . K or from the data $d_{Q2}^{(k)}$, k=1 . . . K which are source-coded in the submodule S1 are subjected to channel coding with subsequent interleaving. The data from a first data source Q1 are transmitted on a useful data channel TCH, and the data from a second data source Q2 are transmitted on a signaling channel SACCH or FACCH.

An n-PSK modulation and spreading of the data with the modulated subscriber-specific CDMA codes $c^{(k)}$, k=1 . . . K is carried out in the submodule S3. Then, the summation of all the spread data sequences takes place in the submodule S4 and there is subsequent integration of the midambles into the burst structure in the submodule S5. This is followed, in the submodule S6, by the spectral shaping of the transmit signal S, and in the modules S7 to S9 the conversion of the time-discrete quadruply oversampled transmit signal in the base band in the bandpass region, continuous in terms of time and value of the transmit frequency band.

Figure 15:
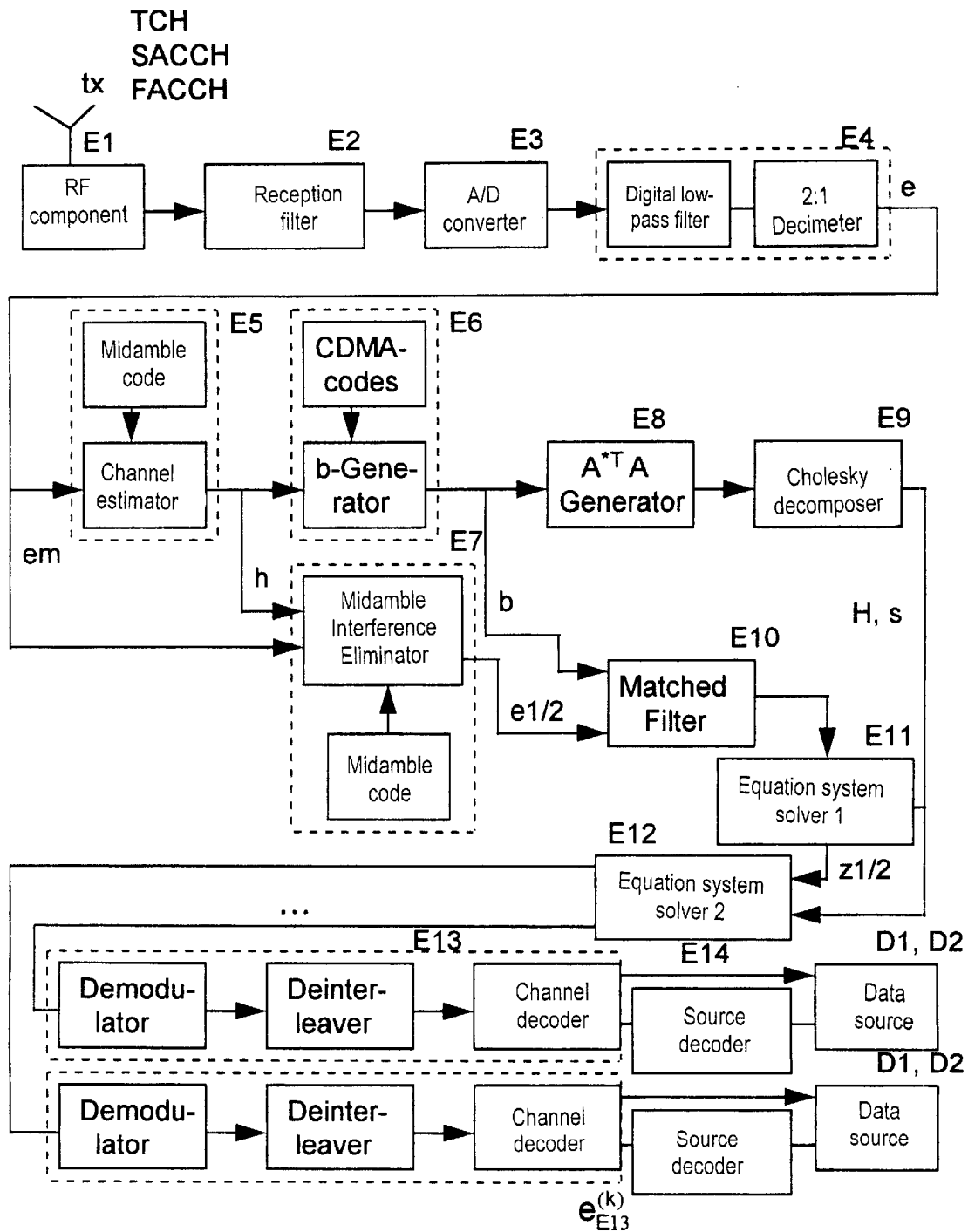
FIG. 15 shows a detailed block circuit diagram of the receiver for TD/CDMA transmission.

The reception path of the device is illustrated in detail in FIG. 15. The conversion of the received signals rx from the transmit frequency band into the lowpass filter region and the splitting into a real component and an imaginary component takes place in the submodule E1. In the submodule E2 there is analog lowpass filtering, and finally in submodule E3 there is double oversampling of the received signal with 13/3 MHz and a word length of 12 bits.

In submodule E4 there is digital lowpass filtering with a filter with a bandwidth of 13/6 MHz with maximum possible steepness of the signal edges for channel separation. Subsequently, in the submodule E4 there is a 2:1 decimation of the doubly oversampled signal.

The received signal e which is acquired in this way consists essentially of two parts, specifically of a component em for channel estimation and of the components e1 and e2 for data estimation. In the submodule E5, all the channel pulse responses $h^{(k)}$ are estimated by means of a known midamble basic code m of all the data channels transmitted in the respective timeslot.

In the submodule E6, parameters $b^{(k)}$ for adapted filters for each data channel are determined using the CDMA codes $c^{(k)}$. In the submodule E7, the interference which originates from the midambles $m^{(k)}$ is eliminated in the reception blocks e1/2 used for data estimation. This is possible by virtue of the knowledge of $h^{(k)}$ and $m^{(k)}$.

In submodule E8, the cross correlation matrix $A^{*T} A$ is calculated. Because $A^{*T} A$ has a Töplitz structure, all that is necessary here is to calculate a small proportion of the matrix which can then be used for a process of expansion to the complete size. In the submodule E9, there is Cholesky decomposition of $A^{*T} A$ into $H^{*T} H$, H being an upper triangular matrix. Owing to the Töplitz structure of $A^{*T} A$, H also approximately has a Töplitz structure and does not need to be calculated completely. A vector s represents the reciprocal values of the diagonal elements of H, which can advantageously be used in the equation system solvers.

In submodule E10, matched filtering of the reception symbol sequences e1/2 with $b^{(k)}$ is carried out. Submodule E11 implements the equation system solvers 1 for $H^{*T}*z1/2=e1/2$, and submodule E12 implements the equation system solvers 2 for H*d1/2=z1/2. In submodule E13, the estimated data d1/2 are demodulated, decrypted and finally convolution-decoded by means of Viterbi decoders. The decoded data blocks $e_{E13}^{(k)}$ are either fed to a first data sink D1 or to a second data sink D2 via the source decoder E14. The source decoding is necessary in data blocks which have been transmitted via signaling channels SACCH or FACCH.

The radio communications system, presented in the exemplary embodiments, for data transmission provides a mobile radio network with a combination of FDMA, TDMA and CDMA and is suitable for the requirements of $3^{rd}$ generation systems. In particular, it is suitable for implementation in existing GSM mobile radio networks for which only a small amount of modification work is necessary.

We claim:

1. A radio communications system organized in radio cells, comprising:
    a base station assigned to a radio cell of the radio communications system, said base station being designed to transmit data in a first mobile radio standard in a first frequency channel;
    said base station having at least one transmitter/receiver device for a second frequency channel with a transmission method according to a second mobile radio standard; and
    said base station signaling, via an organization channel for transmitting signaling information with a transmission method according to the first mobile radio standard, the standards supported in the radio cell and being designed to subsequently selectively set-up a connection in one of said first frequency channel and said second frequency channel.

2. The radio communications system according to claim 1, wherein said organizational channel is transmitted over an entire surface of the radio cell.

3. The method according to claim 1, which further comprises transmitting the organizational channel over an entire surface of the radio cell.

4. A method of transmitting data in a mobile radio network having a first base station assigned to a radio cell, which comprises the following steps:
    making available, with a first base station assigned to a radio cell, a first frequency channel for data transmission and an organization channel for transmitting signaling information with a transmission method according to a first mobile radio standard;
    additionally making available, with the first base station, a second frequency channel with a transmission method according to a second mobile radio standard;
    signaling via the organization channel of the first mobile radio standard the standards supported in the radio cell; and
    subsequently selectively setting-up a connection in one of the frequency channels.

5. The method according to claim 4, which comprises implementing the first frequency channel and the second frequency channel by means of different transmitter/receiver devices of the first base station, and using further modules commonly.

6. The method according to claim 4, which comprises, in a handover of a connection and for a connection setup, interrogating a desired data rate and selecting the first frequency channel or the second frequency channel accordingly.

7. The method according to claim 4, which comprises implementing the first frequency channel and the second frequency channel in a common transmitter/receiver device of the first base station.

8. The method according to claim 4, which comprises handing over the connection to the respectively other frequency channel without selecting a second base station.

9. The method according to claim 4, which comprises handing over connections from a second base station without TD/CDMA compatibility with a preference to the first base station.

10. The method according to claim 4, wherein the first mobile radio standard is a GSM standard and the second mobile radio standard is a third generation mobile radio standard.

11. The method according to claim 4, wherein, during a connection, when services are being additionally used, handing over the connection to the second frequency channel .

12. The method according to claim 4, wherein the first and second frequency channels are implemented in the same frequency band, but in different timeslots.

13. The method according to claim 12, which comprises controlling, with a base station controller, a distribution of a plurality of connections among the timeslots such that a handover of a connection to a respectively other transmission method is carried out as soon as a ratio of the mobile station with TD/CDMA compatibility to other mobile stations within a radio environment reaches a second threshold value.

14. The method according to claim 12, which comprises controlling, with a base station controller, a distribution of a plurality of connections among the timeslots such that a handover of a connection to the respective other transmission method takes place as soon as a utilization capacity of a timeslot drops below a first threshold value.

15. The method according to claim 12, which comprises controlling, with a base station controller, a distribution of a plurality of connections among the timeslots such that a timeslot of a TDMA or TD/CDMA transmission method is handed over for the respective other transmission method.

16. The method according to claim 4, which comprises utilizing the signaling information of the first frequency channel for handing over connections.

17. The method according to claim 4, which comprises utilizing the signaling information of the first frequency channel for setting up connections.

18. The method according to claim 4, wherein the frequency bands of the first and second frequency channels overlap.

* * * * *